United States Patent [19]

Robbins, Jr.

[11] Patent Number: 4,706,942

[45] Date of Patent: Nov. 17, 1987

[54] PADDOCK FENCE LAYOUT WITH CONCRETE FOOTINGS

[75] Inventor: Edward S. Robbins, Jr., Florence, Ala.

[73] Assignee: Centaur Fencing Systems, Inc., Muscle Shoals, Ala.

[21] Appl. No.: 892,042

[22] Filed: Aug. 1, 1986

[51] Int. Cl.⁴ .............................................. B21F 27/00
[52] U.S. Cl. ........................................ 256/35; 256/37
[58] Field of Search ...................... 256/37, 40, 41, 35, 256/36, 73

[56] References Cited

U.S. PATENT DOCUMENTS

| 81,367 | 8/1868 | Hayden | 256/37 |
|---|---|---|---|
| 274,118 | 3/1883 | Gholson | 256/40 |
| 344,660 | 6/1886 | Kelly | 256/37 |
| 925,940 | 6/1909 | McClintock | 256/19 X |
| 4,465,263 | 8/1984 | Robbins, Jr. | 256/52 |

Primary Examiner—Andrew V. Kundrat
Attorney, Agent, or Firm—Nixon & Vanderhye

[57] ABSTRACT

A fence line layout is disclosed which includes a plurality of fence posts, at least one gate post assembly including first and second gate post members and a gate post support, at least one corner post assembly including at least one corner post member and a foot portion coupled to each of the corner post members and extending horizontally therefrom, at least one elongated length of fencing material, of the type including wire or fiber ensheathed in plastic, slidably coupled to each of the fence posts, and a tensioning assembly provided on each of the elongated lengths of fencing material and being adapted to tension the fencing material about the fence line. The gate post supports and the foot portions on each of the corner post members are adapted to maintain the corner post members in an upright disposition when the fencing material is tensioned by the tensioning assembly.

33 Claims, 8 Drawing Figures

PADDOCK FENCE LAYOUT WITH CONCRETE FOOTINGS

BACKGROUND OF THE INVENTION

1. Field of the Invention

This application relates generally to fence layout systems, particularly those which are used to confine livestock and other valuable animals.

2. Description of the Prior Art

Fences are the most commonly employed means for confining livestock such as commmon farm animals, steers, and even thoroughbred race horses. Fences may vary greatly in both structure and materials of composition. Common fence structures include wire fences, such as barbed wire or chain link, and wood fences, such as picket fences and split rail fences. Common fence materials include metal, wood, and stone. Fence structure and composition are selected on the basis of initial and upkeep costs, durability, strength, aesthetic characteristics, and animal safety requirements.

The fencing material that has been most widely used due to the low cost of installation and maintenance is barbed wire. However, barbed wire suffers from the disadvantage that it can cause painful and unsightly injury to valuable stock. All too frequently, animals in an agitated state are unable to detect the presence of the barbed wire, particularly in poor light conditions. Furthermore, barbed wire has a very thin cross section so that it is not easy to see; and an animal is correspondingly more apt to contact a barbed wire fence than it would be to contact a more visible barrier. In addition, barbed wire lacks the aesthetic appeal of other types of fence. Other types of wire fencing known in this art, such as web wire fencing and cyclone wire fencing, suffer from similar limitations. In addition, they tend to be expensive to install and maintain and can, over a period of time, result in the same difficulties with respect to damage to livestock as is the case with barbed wire.

In maintaining certain types of livestock, such as thoroughbred race horses, or animals of similar value, entirely wooden fences have been employed which, while pleasing to the eye and relatively safe to the animal, are expensive to install and maintain.

In an effort to obtain both the visibility of wood fencing and the low cost and maintenance of wire fencing, some fences have been constructed of wire webbing with wooden boards enmeshed therein. The durability of these fences is limited by the tendency of wood to weather and rot. Another disadvantage is the relative costliness of wood as a fencing material and the constant expense of maintaining wood fences.

In confronting the foregoing difficulties, it is known in the prior art to use metals and plastic to form fencing material such as that disclosed in U.S. Pat. No. 3,887,140, granted to Topolsek on Apr. 15, 1975 which discloses a picket fence composed of metal and plastic. The fence described there, however, while apparently well suited to applications not requiring a great deal of strength, would not appear to be suitable for applications such as the confinement of livestock or the enclosure of great spans of land.

SUMMARY OF THE INVENTION

The present invention is a method of forming a fence line layout and the fence line system formed thereby. The fence line formed in accordance with the present invention is comprised of a plurality of fence post members that are disposed in an array so as, for example, to enclose a given area of land. A fencing material is slidably coupled to each of the posts. The fence material is comprised of at least two wires or fibers, having a high tensile strength, ensheathed in a plastic casing, the plastic casing both enclosing the wires or fibers and retaining them in a fixed vertical separation. The wire or fiber may be of any diameter suitable for the strength required in service. In many applications, for example, 8, 12½, or 16 gauge wire or fiber may suffice. Between the wires or fibers, the plastic casing assumes the form of a sheet or web so that the cross section of a strip of fencing material according to one embodiment of the present invention, taken perpendicular to the length of any pair of adjacent wires, is approximately dumbbell shaped. The web itself may have any thickness but is preferably in the range of about 30 mils to 100 mils.

The fencing material is slideably mounted on the fence posts with the aid of brackets so that the wires or fibers run the length of the fence. A fence so constructed has the advantages of high visibility, good strength, and relatively low cost of purchase, installation, and upkeep. Also, such a fence will neither cut nor gouge the hides of valuable livestock and can be used for the close confinement of such animals. This is extremely important when the fence line layout is being used to confine livestock, such as thoroughbred racehorses, where any damage to the legs or any other part of the animals' bodies possibly resulting in death or serious injury must be prevented.

The fence line layout of the present invention includes at least one termination assembly or gate post assembly. Each of the gate post assemblies includes at least a first and, preferably, also a second gate post member. Each of the gate post members includes at least one fence post. The gate post assembly also includes a gate post support assembly. This gate post support assembly includes both vertical and horizontal supports which are provided, respectively, about and between the fence posts which make up each gate post. In the preferred embodiment, the vertical and horizontal supports of the gate post support assembly are provided underground and are formed from concrete. Preferably, the concrete supports are provided at least 6 inches below the surface of the enclosure to avoid possible damage to the animals and preferably extend below the frost line of the region. The gate post support assembly further includes a support element placed between and, preferably, immediately adjacent the top of the fence posts making up the gate post. A length of fencing material is affixed at each end thereof to a gate post member, and is slideably mounted to each of the fence posts disposed so as to form the fence line layout. At least one tensioning assembly is further provided along each length of the fencing material, preferably midway along the length thereof. The tensioning assembly for the fence line layout includes tensioning means provided between each of the wire fibers in each length of the fencing material. In the preferred embodiment, the tensioning means are rachet members. The tensioning means as well as the slideable fence post attachment of the fencing material enable the fencing material to be pulled taut. The tensioning assembly is further provided with a cover (preferably in three pieces) for protecting the tensioning means from the weather or tampering as well as for protecting the animals from injury. Each end of the cover is provided with an aperture so as to enable the fencing material to be passed therethrough but excluding the weather and insects, such as bees, which may respectively damage the rachet members, hinder the use thereof and injure the animals.

A further feature of the present invention is the provision of a concrete foot member on corner posts of the fence line. As used herein, corner post refers to those fence posts along the fence line that are located at a corner of the enclosure or at any point along the fence line where the curvature of the fence line deviates fairly significantly from zero (e.g., 10° or more). The foot member which is provided on each of the aforementioned corner posts includes a block member which extends inwardly relative to the fence line layout. In the preferred embodiment, the foot member is formed from concrete and is preferably provided at least 6 inches below the ground surface of the enclosure and preferably extends below the frost line of the region. The foot member so disposed resists forces which are applied to the fence post of the corner post when the fencing material is tensioned by the tensioning assembly. The fence line so formed provides a safe and sturdy enclosure for livestock. In particular, if an enclosed animal should collide with a fence line that is slideably mounted and tensioned, in accordance with this invention, the fencing material will distort and absorb, much as a rubber band would, the energy of the collision.

Fences formed by the method of the present invention can include any number of wires or fibers encased in the plastic material as well as any number of lines of plastic material disposed vertically along the fence post and surrounding the enclosure. For example, a fence according to the present invention can be comprised of two, three, or even more wires or fibers encased in the plastic web with a two wire or fiber fence strand having a width of about 2.5 inches and a three wire fence strand having a width of approximately 5.5 inches. Similarly, a fence formed in accordance with the present invention can be comprised of two, three, or more lines of plastic material provided vertically along the fence post so as to surround the enclosure.

BRIEF DESCRIPTION OF THE DRAWINGS

These and other advantages of the invention will become more readily apparent from the following detailed description of the presently preferred exemplary embodiment, taken together with the accompanying drawings, of which.

DETAILED DESCRIPTION OF THE PREFERRED EMBODIMENTS

Figure 1:
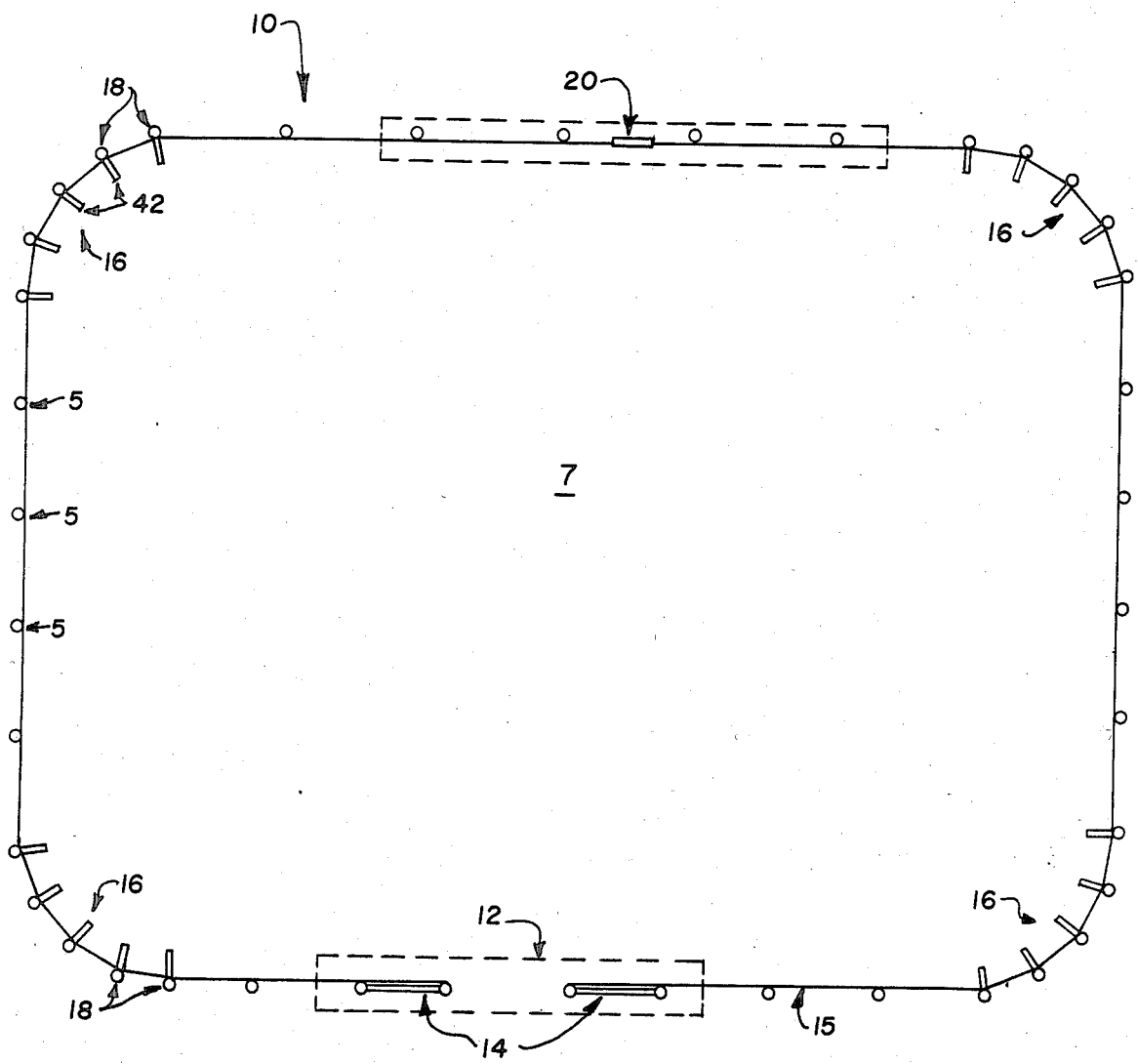
FIG. 1 is a top plan view of a fence line layout in accordance with the present invention.

Referring now to the drawings where like numerals designate corresponding parts throughout several views, FIG. 1 shows a fence line layout 10 according to the present invention. As can be seen, the fence line layout 10 comprises a plurality of fence posts 5 which are partially implanted into the ground and are disposed in an array so as to define an area to be enclosed. The fence line layout 10 includes at least one termination or gate post assembly 12 which preferably includes first and second gate post members 14. Each of the gate post members 14 includes at least one of the fence posts 5. In the preferred embodiment, a length of fencing material 15 is coupled at each end thereof to the first and second gate post members 14, respectively, of the gate post assembly 12 and is slideably coupled to each of the fence post 5 that are disposed between the gate post members 14.

While in the illustrated embodiment only one gate post assembly is shown, it is clear that any number of gate assemblies could be provided about the periphery of the enclosure so as to provide a number of gate openings thereabout. It is also contemplated that the present invention could be utilized to create a termination assembly where there is no gate or entry way, such as the inside fence as a thoroughbred race track.

The fence line layout 10 further includes a plurality of corner assemblies 16 which are provided, preferably, where the fence line deviates substantially from a straight line to define a corner area. In the illustrated embodiment, there are four corner post assemblies, however, any number of corner post assemblies could be provided along the fence line layout 10. Further, in the illustrated embodiment, each of the corner post assemblies comprises five corner posts 18. Of course, any number of corner posts 18 could be provided at each corner post assembly 16.

The fence line layout 10 is also provided with at least one tensioning assembly 20 for tensioning each of the lines of fencing material 15. In the preferred embodiment, each tensioning assembly 20 is provided midway along its respective length of fencing material 15.

Figure 2:
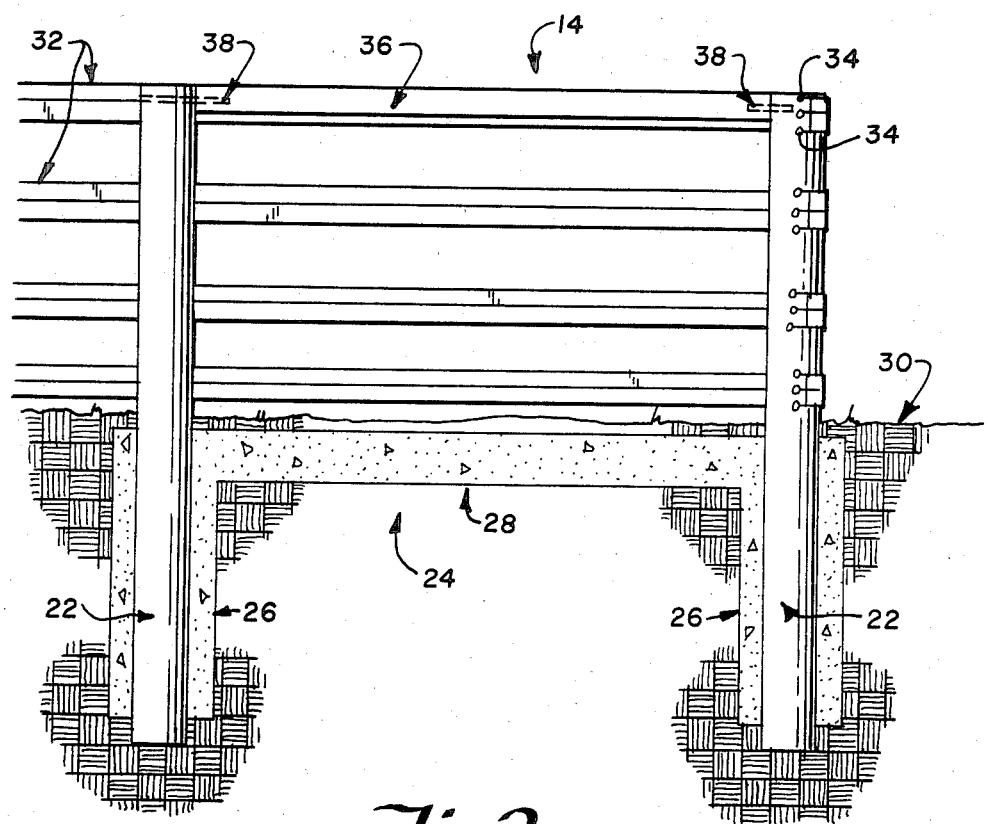
FIG. 2 is a plan view of a gate post assembly in accordance with the present invention.

FIG. 2 is a side view of one of the gate posts 14 of the preferred gate post assembly 12. The gate post 14 includes first and second fence post 22 which are implanted in the ground in upright fashion so that, in the preferred embodiment, approximately one-half of their length is provided below ground and one-half above ground. The portion of the fence post 22 that is provided below ground is preferably at least partially embedded in a gate post support 24. The gate post support 24 includes two vertically extending portions 26 each surrounding one of the fence post 22 and a horizontal portion 28 which extends between the two vertical portions 26. In the preferred embodiment, the horizontal portion 28 of the gate post support 24 extends along the ground a distance of about 6 inches from the surface 30 of the ground and the upper end of each of the vertical portions 26 of the gate post support 24 terminate a distance of about 6 inches from the surface 30 of the ground. In addition, in the preferred embodiment, the gate post support is formed from concrete.

As can be further seen in FIG. 2, fence material 32 is coupled to one of the fence posts 22 of the gate post 14 by suitable fasteners 34 which preferably couple the wires or fibers provided in the fence material 32 to the fence post 22. The fence material 32 so coupled may be provided about the interior or about the exterior of the plurality of fence posts forming the fence line layout 10.

A further support member 36 is also provided for gate post 14. The support member 36 is coupled with suitable fastening means 38, shown in broken lines in FIG. 2, to the fence posts 22. Preferably, the support member 36 is provided immediately adjacent the top of each of the fence posts 22 and between the same. The support member 36 may be of any shape and material suitable for spacing and supporting the fence posts 22, but in the preferred embodiment the support member 36 is cylindrical in shape, having a diameter of 3 or 4 inches, and is formed of metal or wood. Similarly, the fence post 22 may be formed of any suitable material but in the preferred embodiment are formed of cylindrical pieces of wood.

Figure 3:
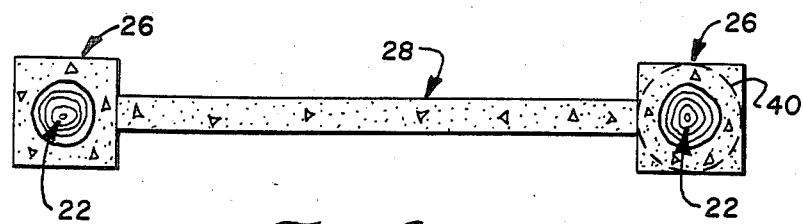
FIG. 3 is a bottom plan view of the gate post assembly of FIG. 2.

Turning now to FIG. 3, a bottom plan view of the gate post 14 is shown. As can be seen, in the preferred embodiment the vertical portions 26 of the gate post 20 support 24 surround the fence post 22. Furthermore, the vertical portions 26 may be rectangular in shape or, as shown with dash lines 40, the vertical portion of gate post support 24 may be circular in shape.

Figure 4:
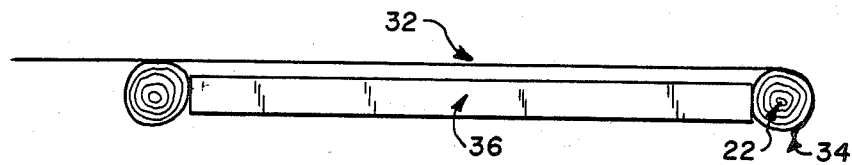
FIG. 4 is a top plan view of the gate post assembly of FIG. 2.

Turning now to FIG. 4, a top view of gate post 14 is shown illustrating support member 36 extending between fence post 22. As further illustrated in FIG. 4, the fence material 32 extends around the fence post 22 to which it is attached with fasteners 34, as described above.

Figure 5:
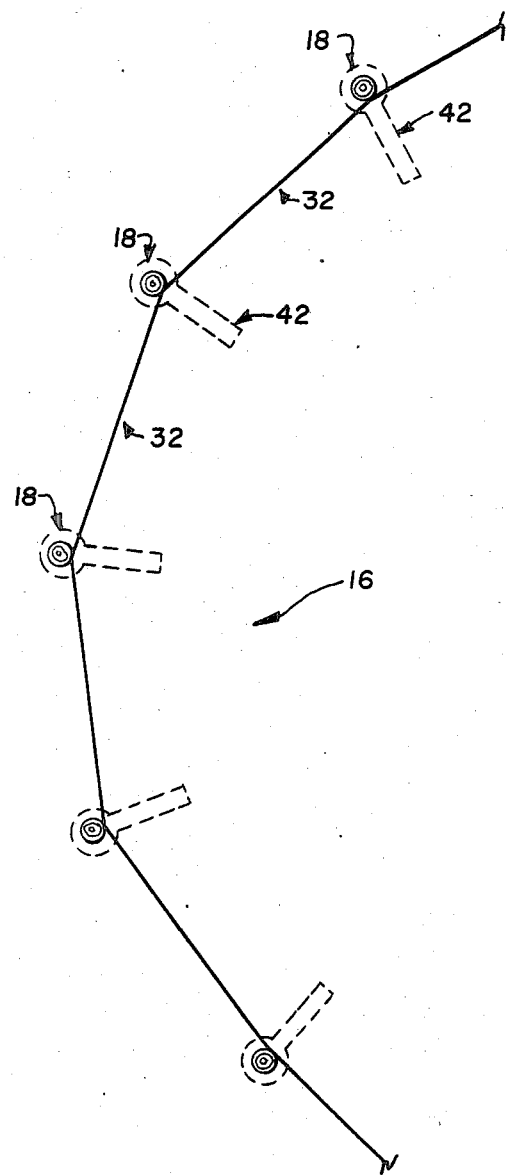
FIG. 5 is a top plan view of a corner post assembly in accordance with one embodiment of the present invention.

Referring now to FIG. 5, the corner post assembly 16 of the preferred embodiment is shown. In the illustrated embodiment, five corner posts 18 are provided at a given corner post assembly 16. In the illustrated embodiment of corner post assembly 16, the fence material 32 extends along the interior of the corner post 18, however, the fencing material 32 may be provided along the exterior of the gate post relative to the enclosed area. As further seen in FIG. 5, each of corner posts 18 is provided with a foot portion 42, shown in dashed lines, which extends inwardly relative to the fence line. The foot portion 42 secures and stabilizes the associated corner post 18 as will hereinafter be described.

Figure 7:
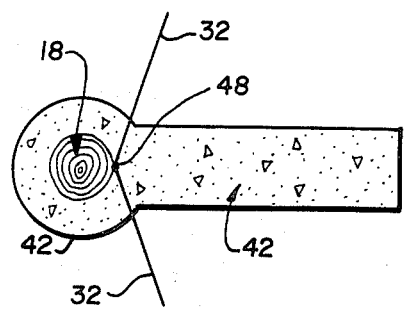
FIG. 7 is a top plan view of the corner post of FIG. 5.
Figure 6:
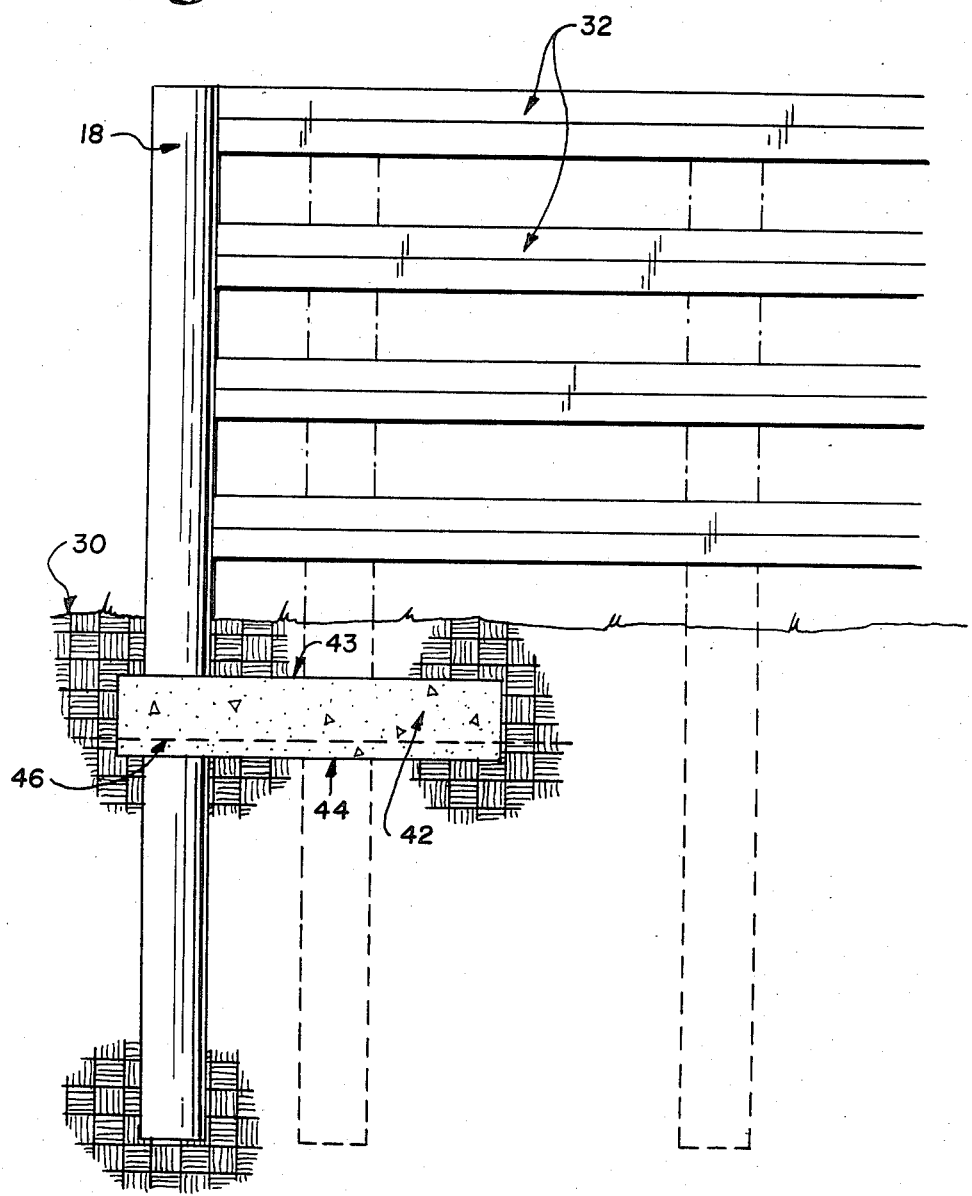
FIG. 6 is a side plan view of the corner post of FIG. 5.

FIG. 6 shows a side view of the corner post 18 and foot portion 42 of the preferred form of the present invention. As can be seen, corner post 18 is preferably disposed in the ground so that one-half of its length is disposed below the surface 30 of the ground and one-half its length is provided above the surface 30 of the ground. As clearly shown in FIGS. 6 and 7, foot portion 42 surrounds corner post 18 and extends along at least a portion of the submerged length thereof. In the preferred embodiment, the foot portion 42 has its upper most surface 43 disposed 6 inches below the surface 30 of the ground and has a length such that the lower most portion thereof 44 is disposed beneath the frost line 46 shown in dotted lines in FIG. 6. Additionally, in the preferred embodiment, the foot portion 42 is formed from concrete. As can be seen in FIGS. 6 and 7, foot portion 42 includes an extension 42' which extends horizontally inwardly relative to the corner post 18 and mounted fencing material 32. The footing portion 42 so disposed provides stability and support for corner post 18 as will be described more fully hereinafter. As will also become more apparent, the foot portion 42, while illustrated as being a generally horizontal block, may be oriented at any angle that will tend to resist an inward force applied to the corner post 18. As can be seen in FIG. 7, each of the corner posts 18 is further provided with bracket means 48 for slidably mounting the fencing material 32 thereto. Moreover, a support member 36 of the type shown in FIG. 2 may be utilized to provide additional stability and support.

Figure 8:
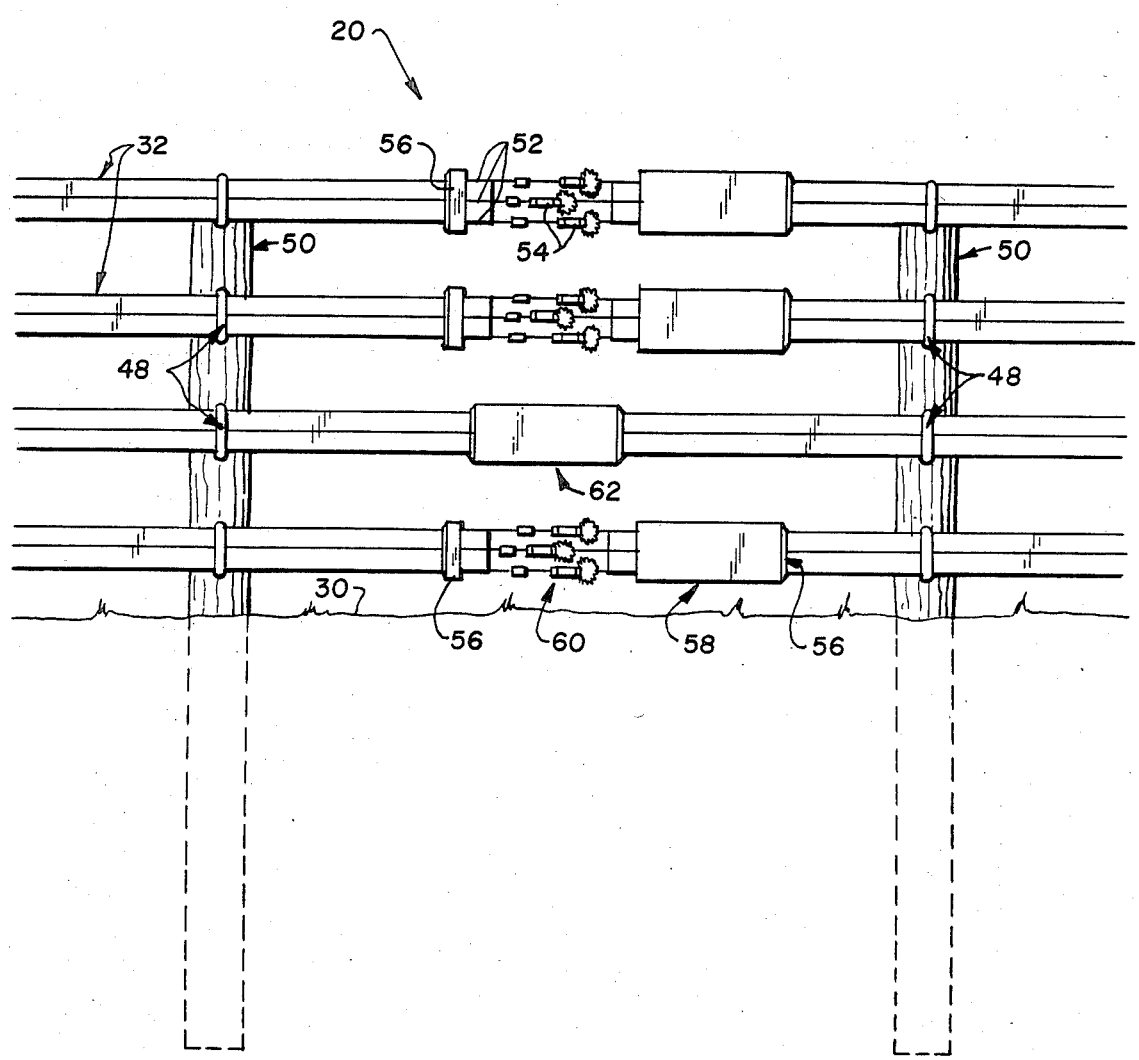
FIG. 8 is a plan view of a tensioning assembly in accordance with the present invention.

Referring now to FIG. 8, the tensioning assembly 20 of the fence line layout 10 is shown. The tensioning assembly 20 is preferably provided between two adjacent fence posts 50. Again, each of the fence posts 50 is preferably provided so that approximately one-half of its length is provided below the surface 30 of the ground, as shown in dashed line, and one-half of its length is provided above ground. Furthermore, fencing material 32 is slidably coupled to fence posts 50 with bracket means 48. In the illustrated embodiment, four lines of fencing material 32 are provided with each of the lines of fencing material 32 being slidably coupled to fencing posts 50 with a bracket means 48.

The tensioning assembly 20 includes a tensioning means 60 provided along each of the fencing material lines 32. Each of the tensioning means 60 includes ratchet means 54 which are provided along each of the wires or fibers 52 provided in the fencing material 32. The ratchet means 54 are provided to tension the respective wire or fiber 52 so as to pull the fence material 32 into a taut relation about the fence line layout.

The tensioning assembly 20 further includes cover means 62 which are provided about each of the tensioning means 60. Each of the cover means 62 includes, preferably, first and second end portions 56 and a central portion 58 which may be coupled together. The first and second portions 56 of the cover means 62 are each provided with suitable apertures (not shown) to enable the first and second end portions 56 to be slidably received on the fencing material 32. The apertures provided in the cover means are of such a size that, while enabling sliding movement, they prevent excessive moisture or insects, such as bees, from entering the closed cover means 62. Thus, the cover means 62 not only protects the tensioning means 60 from corrosion and weathering, but also protects those persons accessing the ratchet means 54 from harmful insects that would otherwise nest within the cover means 62.

Turning now to the method by which the fence line layout of the present invention is assembled and utilized, as shown in FIG. 1 a plurality of fence posts 5 are provided in an array surrounding an area 7 to be enclosed. A gate post 14 including fence posts 22 and gate post support 24 are provided on either side of those portions of the fence line layout 10 where, if desired, a gate or opening is provided. Furthermore, specialized corner posts 18 with associated footing portions 42 are provided along those portions of the fence line layout that deviate substantially from a straight line. A plurality of lengths of fencing material 32 are then fastened by appropriate fastening means 34 to a fence post 22 in the fence line layout 10. The lengths of fencing material 32 are then aligned with each of the fence posts 5, corner posts 18, and posts 50 adjacent the tensioning means 60, the fencing material being slidably coupled to each of the posts 5, 18, and 50, respectively, with bracket means 48. At the location of the tensioning means 60, the plastic material of the fencing material 32 is interrupted so as to expose the wires or fibers 52 in the fencing material 32. Each of the exposed wires or fibers 52 on each length of fencing material 32 are coupled to a ratchet means 54. The ratchet means 54 enable the wires or fibers 52 of each length of fencing material 32 to be placed under a great degree of tension so as to pull the fencing material into a taut configuration about the fence line layout 10. The high degree of tension applied to each length of fencing material and the slidable attachment of the fence material 32 to the fence posts 5, 18, and 50 enable a firm and sturdy fence line layout 10 to be formed whereby any distortion of the fence line material 32 caused by enclosed livestock or caused by other contact will be absorbed by the remainder of the fence material 32 disposed about the perimeter of the enclosure as defined by the fence line layout 10. The ratchet means 54, after being adjusted so as to pull the fence material 32 into a tensioned relation, are covered by the cover means 62 to protect same from tampering or corrosion. The foot portions 42 of the corner posts 18, being disposed inwardly relative to the corner posts 18 and fence material 32, serve to secure and retain the corner posts 18 in upright fashion by resisting the inward pull exerted thereon when said ratchet means 54 are utilized to tension the wires or fibers 52 and when enclosed livestock or other contact generate a force on the fencing material.

While the fence line layout of the present invention has been described as preferably defining an enclosure, it is clear that the advantages of the disclosed fence line could also be employed in forming elongated barriers.

Having described the invention, it will be apparent to those skilled in the art that various modifications will be made thereto without departing from the spirit and scope of this invention as defined in the appended claims.

What is claimed is:

1. A fence system comprising:
    at least one gate post assembly, each said gate post assembly comprising first and second gate post members, each said gate post member including at least one fence post means, adapted to be partially implanted in the ground, and a gate post support means;
    at least one corner post assembly defining at least one corner area in said fence system, each said corner post assembly comprising at least one corner post member, each said corner post member including a fence post means, adapted to be partially implanted in the ground, and a foot portion coupled to said fence post means;
    at least one elongated length of fencing material of the type including platic encased high tensile wires or fibers, each of said at least one length of fencing material being coupled at each end thereof to a first and second gate post member, respectively, and being slidably coupled to at least one of said at least one corner post members;
    at least one tensioning means for tensioning each of said at least one length of fencing material, provided on each of said at least one length of fencing material, so that
    the fencing material may be tensioned between the coupled ends thereof; and
    wherein the foot portion of each said corner post member includes an extension that is adapted to project substantially radially away from adjacent fencing material, to thereby maintain its respective fence post means in a substantially upright disposition against the force exerted thereon by the tensioned fencing material.

2. A fence system as claimed in claim 1 wherein said foot portion is coupled to a portion of its respective fence post means and extends horizontally therefrom, said foot portion having an upper surface adapted to be positioned about 6 inches below the surface of the ground and a lower surface adapted to be positioned at a depth at least below the frost line.

3. A fence system as claimed in claim 2 wherein said foot portion is formed from concrete.

4. A fence system as claimed in claim 1 wherein said gate post support includes a vertical portion coupled to a portion of each of said at least one fence post means of each said gate post member, said vertical portion adapted to extend from about 6 inches below the surface of the ground to at least a depth below the frost line.

5. A fence system as claimed in claim 4 wherein each said gate post member includes at least two fence post means and said gate post support includes at least one portion that extends horizontally between adjacent vertical portions thereof.

6. A fence systems as claimed in claim 5 wherein said post support is formed from concrete and the gate post member further includes a support member which in use extends above ground between said two fence post means.

7. A fence system as claimed in claim 1 wherein each said at least one length of fencing material includes a portion where the plastic material is interrupted so as to expose the wires or fibers provided therein, said tensioning means being provided at said interrupted portions and being coupled to said wires or fibers.

8. A fence system as claimed in claim 7 wherein said tensioning means includes rachet means coupled to each said wire or fiber.

9. A fence system as claimed in claim 1 wherein a plurality of said elongated lengths of flexible material are provided at vertically spaced intervals on each of said first and second gate post members.

10. A fence system comprising:
    a plurality of fence post means, adapted to be partially implanted in the ground, and disposed in an array so as to define an area to be at least partially enclosed;
    at least one gate post assembly, each said gate post assembly comprising first and second gate post members, each said gate post member including at least one of said fence post means, and a gate post support means;
    at least one corner post assembly defining at least one corner area in said fence system, each said corner post assembly comprising at least one corner post member, each said corner post member including one of said fence post means and a foot portion coupled to said fence post means;
    at least one elongated length of fencing material of the type including plastic encased high tensile wires or fibers each of said at least one length of fencing material being coupled at each end thereof to a first and second gate post member, respectively, and being slidably coupled to each of the fence post means disposed between respective first and second gate post members; and
    at least one tensioning means for tensioning each of said at least one length of fencing material, provided on each of said at least one length of fencing material, so that
    the fencing material may be tensioned between each of the first and second gate post members; and wherein the foot portion of each said corner post member includes an extension that is adapted to project substantially radially away from adjacent fencing material in said corner area, to thereby maintain its respective fence post means in an upright disposition against the force exerted thereon by the tensioned fencing material.

11. A fence system as claimed in claim 10 wherein said array of fence post means includes at least one substantially straight line portion, a corner post assembly being provided at least at each end of each said at least one straight line portion.

12. A fence system as claimed in claim 11 wherein said array of fence post means includes four straight line portions and four corner post assemblies, each said corner post assembly being disposed between the ends of adjacent straight line portions.

13. A fence system as claimed in claim 12 wherein each said corner post assembly includes five corner post members.

14. A fence system as claimed in claim 10 wherein said foot portion is coupled to a portion of said fence post means of said corner post member and extends horizontally therefrom, said foot portion having an upper surface adapted to be positioned about 6 inches below the surface of the ground and a lower surface adapted to be positioned at a depth at least below the frost line.

15. A fence system as claimed in claim 14 wherein said foot portion is formed from concrete.

16. A fence system as claimed in claim 10 wherein said gate post support includes a vertical portion coupled to a portion of each of said at least one fence post means of each said gate post member, said vertical portion adapted to extend from about 6 inches below the surface of the ground to at least a depth below the frost line.

17. A fence system as claimed in claim 16 wherein each said gate post member includes at least two fence post means and said gate post support includes at least one portion that extends horizontally between adjacent vertical portions thereof.

18. A fence system as claimed in claim 17 wherein said gate post support is formed from concrete and said gate post member further includes a support member which in use extends above ground between said two fence post means.

19. A fence system as claimed in claim 10 wherein each said elongated lengths of fencing material includes a portion where the plastic material is interrupted so as to expose the wires or fibers provided therein, said tensioning means being provided at said interrupted portions and being coupled to said wires or fibers.

20. A fence system as claimed in claim 19 wherein said tensioning means includes rachet means coupled to each said wire or fiber.

21. A fence system as claimed in claim 10 wherein a plurality of said elongated lengths of fencing material are provided at vertically spaced intervals on each said first and second gate post members.

22. A method of forming a fence line layout comprising:
providing a plurality of fence post means, adapted to be partially implanted in the ground, so as to form an array that defines an area to be at least partially enclosed;
providing at least one elongated length of flexible fencing material of the type including plastic encased high tensile wires or fibers;
providing at least one gate post assembly, each said gate post assembly comprising first and second gate post members, each said gate post member including at least one of said fence post means and a gate post support means;
providing at least one corner post assembly defining a corner area in said fence line layout, each said corner post assembly comprising at least one corner post member, each said corner post member including one of said fence post means and a foot portion coupled to said fence post means, said foot portion including an extension projecting horizontally therefrom and radially away from adjacent fencing material;
coupling each of said at least one length of flexible fencing material at each end thereof to a first and second gate post member, respectively, and slidably coupling each said at least one length of flexible fencing material to the fence post means forming said array;
providing at least one tensioning means for tensioning each of said at least one length of flexible material, on each of said at least one length of flexible fencing material; and
tightening said tensioning means so as to pull each of said at least one length of flexible fencing material into a taut relation about the fence line array, whereby said foot portions maintain each corner post member in an upright disposition against the force applied thereto by tensioning the flexible fencing material.

23. A fence system comprising:
a plurality of fence post means, adapted to be partially implanted in the ground, and disposed in an array so as to define an area to be at least partially enclosed;
at least one corner post assembly defining at least one corner area in said fence system, each said corner post assembly comprising at least one corner post member, each said corner post member including one of said fence post means and a foot portion coupled to said fence post means;
at least one elongated length of fencing material of the type including plastic encased high tensile wires or fibers, each of said at least one length of fencing material being coupled at each end thereof to a fence post means and being slidably coupled to each of the other post means disposed in the array; and
at least one tensioning means for tensioning each of said at least one length of fencing material, provided on each of said at least one length of fencing material, so that
the fencing material may be tensioned about the array of fence post means; and
wherein the foot portion of each said corner post member includes an extension that is adapted to project substantially radially away from adjacent fencing material in said corner area, to thereby maintain its respective fence post means in an upright disposition against the force exerted thereon by the tensioned fencing material.

24. A fence system as claimed in claim 23, wherein said foot portion is coupled to a portion of said fence post means of said corner post member and and extends horizontally therefrom, said foot portion having an upper surface adapted to be positioned about 6 inches below the surface of the ground and a lower surface adapted to be positioned at a depth at least below the frost line.

25. A fence system as claimed in claim 24, wherein said foot portion is formed from concrete.

26. A method of forming a fence line layout, comprising:
providing at least one elongated length of fencing material of the type including plastic encased high tensile wires or fibers;
providing a plurality of fence post means adapted to be partially implanted in the ground, so as to form an array that defines an area to be at least paritally enclosed;
providing at least one corner post assembly defining at least one corner area in said fence line layout, each said corner post assembly comprising at least one corner post member, each said corner post member including one of said fence post means and a foot portion coupled to said fence post means, said foot portion including an extension projecting horizontally therefrom and radially away from adjacent fencing material;
coupling each of said at least one length of fencing material at each end thereof to a fence post means and slidably coupling each said at least one length of fencing material to the other fence post means forming said array;
providing at least one tensioning means for tensioning each of said at least one length of fencing material, on each of said at least one length of fencing material; and
tightening said tensioning means so as to pull each of said at least one length of fencing material into a taut relation about the fence line array, whereby said foot portions maintain each corner post member in an upright disposition against the force applied thereto by tensioning the fencing material.

27. A fence system comprising:
at least one gate post assembly, each said gate post assembly comprising first and second gate post members, each said gate post member including at least one fence post means, partially implanted in the ground, and a gate post support means;
at least one corner post assembly, each said corner post assembly comprising at least one corner post member, each said corner post member including a fence post means, partially implanted in the ground, and a foot portion coupled to said fence post means;
at least one elongated length of flexible plastic fencing material;
at least one tensioning means for tensioning each of said at least one length of flexible fencing material, provided on each said at least one length of flexible fencing material,
whereby, the flexible fencing material may be tensioned between the coupled ends thereof; and wherein
the foot portion of each said corner post member being positioned to extend from each said corner post member in the direction of the force exerted on said corner post member by the tensioned flexible fencing material so as to resist said force.

28. A fence system as claimed in claim 27 wherein said tensioning means includes ratchet means coupled to each said wire or fiber.

29. A fence system comprising:
a plurality of fence post means, partially implanted in the ground, and disposed in an array so as to define an area to be at least partially enclosed;
at least one corner post assembly, each said corner post assembly comprising at least one corner post member, each said corner post member including a fence post means and a foot portion coupled to said fence post means;
at least one elongated length of flexible fencing material of the type including an elongated web of plastic and encasing at least one high wire or fiber;
at least one tensioning means for tensioning each of said at least one length of flexible fencing material, provided on each of said at least one length of flexible fencing material,
whereby the flexible fencing material may be tensioned between spaced fence post means, the foot portion of each said corner post member being positioned to extend from each said corner post member in the direction of the force exerted on said corner post member by the tensioned flexible fencing material so as to resist said force; and
wherein said array of fence post means includes four straight line portions and four corner post assemblies, each said corner post assembly being disposed between the ends of adjacent straight line portions.

30. A fence system comprising:
a plurality of fence post means, partially implanted in the ground, and disposed in an array so as to define an area to be at least partially enclosed;
at least one gate post assembly, each said gate post assembly comprising first and second gate post members, each of said gate post members including at least one of said fence post means, and a gate post support means;
at least one corner post assembly, each said corner post assembly comprising at least one corner post member, each said corner post member including one of said fence post means and a foot portion coupled to said fence post means;
at least one elongated length of fencing material of the type including an elongated web of plastic having spaced, substantially parallel edges along its length and a substantially flat web portion, each edge having an enlarged cross section relative to said web portion and encasing a high tensile wire or fiber with each said wire or fiber lying substantially in the plane of said web, each of said at least one length of fencing material being coupled at each end thereof to a first and second gate post member, respectively, and being slidably coupled to each of the fence post means disposed between respective first and second gate post members;
at least one tensioning means for tensioning each of said at least one length of fencing material, provided on each said at least one length of fencing material,
whereby the fencing material may be tensioned between each of the first and second gate post members; and wherein
the foot portion of each said corner pot member being positioned to extend from each said corner post member in the direction of the force exerted on said corner post member by the tensioned flexible fencing material so as to resist said force; and wherein each of said at least one elongated length of fencing material includes a portion where the plastic material is interrupted so as to expose the wires or fibers provided therein, said tensioning means being provided at said interrupted portions and being coupled to said wires or fibers.

31. A fence system as claimed in claim 30 wherein said tensioning means include ratchet means coupled to each said wire or fiber.

32. A fence system comprising:
   at least one gate post assembly, each said gate post assembly comprising first and second gate post members, each of said gate post members comprising a pair of fence post means, portions of each of said fence post means adapted to be partially implanted in the ground;
   a gate post support means;
   at least one corner post assembly comprising at least one corner post member;
   at least one elongated length of flexible fencing material of the type including plastic encased high tensile wire or fibers, each of said at least one length of flexible fencing material being coupled at each end thereof to said first and second gate post members, respectively, and being slidably coupled to said at least one corner post member;
   wherein said gate post support means includes vertical portions surrounding substantially all of said portions of said fence post means adapted to be implanted in the ground, and at least one horizontal portion extending between said vertical portions at uppermost surfaces of said vertical portions.

33. A fence system as defined in claim 32 wherein said at least one horizontal portion and said uppermost surfaces of said vertical portions are adapted to extend along the ground a distance of about 6 inches from the surface of the ground and wherein lowermost surfaces of said vertical portions are adapted to extend to a depth at least below the frost line.

* * * * *